United States Patent [19]

Andersson et al.

[11] Patent Number: 5,748,666
[45] Date of Patent: May 5, 1998

[54] METHOD AND FURNACE FOR TREATMENT OF ASH

[75] Inventors: Karl-Hugo Andersson, Schlieren; Sven-Einar Stenkvist, Brugg, both of Switzerland; Göran Wikström, Växjö, Sweden

[73] Assignee: Asea Brown Boveri AG, Baden, Switzerland

[21] Appl. No.: 640,814

[22] PCT Filed: Dec. 22, 1994

[86] PCT No.: PCT/SE94/01241

§ 371 Date: May 8, 1996

§ 102(e) Date: May 8, 1996

[87] PCT Pub. No.: WO95/17981

PCT Pub. Date: Jul. 6, 1995

[30] Foreign Application Priority Data

Dec. 27, 1993 [SE] Sweden ................. 93404284
Mar. 30, 1994 [SE] Sweden ................. 9401065

[51] Int. Cl.$^6$ ........................................ F27D 17/00
[52] U.S. Cl. ........................... 373/9; 373/82; 373/108
[58] Field of Search .................. 373/8, 9, 2, 79–83, 373/108

[56] References Cited

U.S. PATENT DOCUMENTS

| | | |
|---|---|---|
| 4,080,511 | 3/1978 | Collin . |
| 4,242,532 | 12/1980 | Squibbs ................. 373/80 |
| 4,410,996 | 10/1983 | Svensson ................. 373/9 |
| 4,865,643 | 9/1989 | Goins, Jr. et al. ......... 75/10.63 |
| 4,913,732 | 4/1990 | Miyano et al. . |
| 4,957,551 | 9/1990 | Aune et al. . |
| 5,004,496 | 4/1991 | Aune et al. . |
| 5,402,439 | 3/1995 | Bullmann et al. ........... 373/9 |

FOREIGN PATENT DOCUMENTS 556608 8/1993 European Pat. Off. .
654847 3/1979 U.S.S.R. .

OTHER PUBLICATIONS

International Pub. No. WO 93/20252 to H. König et al. for "Method and Device for Processing Free-Flowing Materials," 14 Oct. 1993.

*Primary Examiner*—Tu B. Hoang
*Attorney, Agent, or Firm*—Watson Cole Stevens Davis, P.L.L.C.

[57] ABSTRACT

A method and a d.c. arc furnace for thermal treatment of an ash, wherein reducing conditions are established within a closed and sealed furnace, the ash is supplied via a channel arranged in an electrode which extends towards a metal melt in a furnace shell and provides an arc extending toward the metal melt, the ash being fed from the open free end of the electrode through the arc, any slag and/or the metal melt, whereby the ash is rapidly heated under reducing conditions to a temperature of 1350° C. to 1750° C. such that any organic compounds contained in the ash are broken down, any inorganic salts contained in the ash are at least partially decomposed, any metals included in the ash are partially evaporated and partially integrated into the metal melt, the remaining part of the ash is integrated into the slag which after discharge is cooled to form a glass, any remaining harmful pollutants are dissolved in the glass and any gaseous pollutants which have escaped from the ash/slag are discharged and exhausted into a gas treatment plant.

9 Claims, 2 Drawing Sheets

METHOD AND FURNACE FOR TREATMENT OF ASH

TECHNICAL FIELD

The invention relates to a method for thermal treatment of an ash, such as an ash from waste incineration which at least includes pollutants in the form of metals, salts and/or organic compounds, in an electric melting furnace, in the form of a direct current arc furnace. The invention also relates to a furnace for carrying out the invented method.

BACKGROUND ART

During combustion or pyrolysis of fuels and waste, ash arises which contains varying quantities of undesired constituents, i.e., pollutants, which constitute a problem when depositing or reusing the ash. This applies both to that part of the ash which remains in the combustion chamber, i.e., the bottom ash or the slag, and that part of the ash which accompanies the flue gas out of the combustion chamber and is separated in various cyclones and filters, i.e., the fly ash.

The contents of heavy metals in the ash originate from the fuel or the waste which is burnt and released to a varying extent from the fuel at the high temperatures which prevail in the combustion chamber.

The contents of organic substances in the ash are dependent on the efficiency of the combustion process, to what extent the organic contents in the fuel or the burnt waste can be completely broken down into carbon dioxide and water, and to what extent reformation of organic compounds in the fuel gases is prevented. This undesired reformation of organic compounds, among them greatly toxic compounds such as dioxine, is catalyzed by the ash and influenced by the composition of the ash, above all the metal contents of the ash.

Due to its contents of metals, salts and organic substances, the ash constitutes an environmental problem with effects both in the short run and in the long run. Deposition is made difficult since these pollutants can be released and spread in an uncontrolled manner by leaching into the groundwater. This means that deposition is surrounded by rigorous regulations regarding design, embankment, drainage, etc., and that extensive supervision must be carried out for a long time ahead. In addition, leachate from the deposit must in many cases be treated, that is, cleaned.

Reuse of ash is rendered difficult and is limited since there is a risk of leakage of metals, salts and organic substances. Thus, a contaminated product runs the risk of influencing the environment where the product is used. Examples of areas where attempts are being made with reuse of ash is gravel replacement in road embankments or other landfills and filler in cement.

Waste from ash incineration poses special problems, both because of the relatively large ash quantity and because of its relatively high and greatly varying contents of both metals, salts and organic substances. Both the ash quantity and the ash composition may be influenced by pretreatment of the waste, such as sorting out of non-combustible material; however, the influence on the amount of toxic or otherwise harmful substances is generally relatively insignificant. Typical ash quantities for combustion or other thermal treatment of waste is 10–30 kg fly ash per ton of waste and 200–300 kg bottom ash per ton of waste.

It is known, using different forms of further treatment of the ash, such as embedment and thermal treatment, to try to reduce the environmental effect during deposition or reuse.

Known methods for thermal treatment can be divided according to the process temperature, that is to say, the temperature to which the ash is heated, and if the ash is melted or not.

In low-temperature processes where the ash is not melted, that part of the pollutants which becomes volatile at the process temperature in question is driven off without the shape of the ash being influenced. This volatile part is separated from the flue gases and is then taken care of by filtering, wet separation and/or recondensation.

In processes with a treatment temperature sufficiently high to completely or partially melt the ash, in addition to the driving off of the volatile components, there is also obtained an at least partially vitrified material in which residual pollutants are enclosed when the temperature is lowered and the glass solidifies. By this vitrification, if a suitable glass composition is obtained, the risks of leaching of residual pollutants during deposition and reuse can be reduced.

From European patent application EP 0 556 608, it is known to treat ash from waste incineration in a gas-tight electric resistance furnace where a slag melt is supplied with electrical energy through electrodes, whereby the electrical energy through the electrical resistance in the slag is transformed into thermal energy. This energy development, which contributes to the supplied ash melting and to a molten slag being maintained in the furnace, is supplemented with the energy which is obtained from the reaction of the supplied coal with certain metal oxides present in the ash. The electrodes are arranged with one of their poles in the form of one or more carbon electrodes immersed into the bath, and with the other pole in the form of electrodes built into the furnace shell. According to this publication, particulate ash together with a powdered coal is introduced into the furnace through an immersion lance arranged in the form of a hollow carbon electrode, whereby the ash when being supplied to the furnace will be supplied to the slag below the bath surface of the ash where the ash is heated as a result of heat generated in the slag due to the resistance heating and the reduction reactions. Since the melt is treated at a temperature around that of the slag, that is, approximately 1400°C., this method results in the evaporation losses being small while at the same time large gas quantities, primarily carbon oxide and carbon dioxide, are developed as a result of the reduction reactions. This means, on the one hand, that large gas quantities with small contents of toxic substances, or substances otherwise influencing the environment, must be treated in the gas treatment plant arranged downstream of the furnace, and, on the other hand, that the treatment time of the ash must be adapted such that all ash supplied to the slag is heated to the temperature of the slag. Thus, the treatment time will be greatly dependent on whether a homogeneous slag with good mixing conditions can be obtained.

A problem connected with the above method and other methods for thermal treatment of ash is to ensure that the whole ash quantity is treated at a sufficiently high temperature and for a sufficiently long time to drive out or break down all of the pollutants which are to be removed from or degraded in the ash and to avoid recreation of pollutants separated from the ash, by condensation or otherwise, in the furnace chamber, or formation of other harmful pollutants in the furnace chamber which are supplied to the slag and contaminate it. Nor should gaseous pollutants separated from the ash be diluted with other gases such that its separation from the gases during the subsequent gas treatment process is made more difficult.

As a result of the great variations in the physical properties and chemical composition of ash from incineration or pyrolysis of waste, with known methods for thermal treatment of ash, large parts of the ash will be overtreated to ensure the desired reduction of the pollutant content of the ash and a reduced risk of leaching.

One object of the present invention is to offer a method for thermal treatment of ash, which by means of sufficiently high energy density ensures that the desired driving off and destruction of toxic substances present in the ash, or other substances influencing the environment, are obtained and that the remaining part of the ash is melted upon passage through a well-defined reaction or treatment zone, and that driven-off and degraded pollutants are not supplied to the slag melt, that they are diluted with other gases or that new harmful compounds are formed in the flue gases.

Another object is to suggest a device for carrying out the invented method, which ensures that it can be carried out with a low environmental influence by producing from the ash a vitrified material with attractive properties and shape, while at the same time harmful organic compounds are broken down, essentially into carbon dioxide and water, that salts are decomposed or otherwise degraded, and that metals can at least partially be recovered.

SUMMARY OF THE INVENTION

The invention relates to a process for thermal treatment of an ash, such as an ash from incineration of waste, which at least contains pollutants in the form of metals and/or inorganic salts and/or organic compounds. The invented process is carried out in a direct current arc furnace, a d.c. arc furnace, which at least comprises a furnace shell, a furnace roof arranged over the furnace shell, one or more bottom contacts arranged in or adjacent to the furnace shell and one or more electrodes arranged above the furnace shell. The bottom contact(s) are arranged in contact with a metal melt and connected to positive polarity, while the electrode(s) are connected to negative polarity and the electrode(s) and bottom contacts are arranged to establish and maintain at least one arc within the furnace. The furnace is according to the invention closed and sealed and reducing conditions are established within the sealed furnace. A closed furnace chamber is thereby arranged above any metal melt and/or any slag present in the furnace.

Ash is supplied to the furnace via a channel arranged in the electrode and fed from the open free end of the electrode through the arc, the slag and/or the metal melt, whereby the ash is rapidly heated, under reducing conditions, to a temperature of 1350° C. to 1750° C. such that any organic compounds contained in the ash are broken down, and driven off to the closed furnace chamber, any inorganic salts contained in the ash are at least partially decomposed and driven off to the closed furnace chamber, any metals included in the ash are; partially evaporated and driven off to the closed furnace chamber, partially reduced and molten, where the molten metallic pollutants are mixable with the melt present in the furnace they are integrated into said melt while molten metallic pollutants unmixable with the melt generate a second metallic melt, the remaining part of the ash is melted and integrated into the slag, the slag is discharged from the furnace and after discharge cooled to form a glass or a material having a glass like matrix, any remaining harmful pollutants are, dissolved in, bonded to or enclosed in the glass in a way such that leakage of these pollutants out of the glass is essentially eliminated and any gaseous pollutants which have been driven off or in any other way have escaped from the ash/slag are discharged from said furnace chamber and exhausted into a gas treatment plant.

Before feeding of ash is started, a metallic starting melt, a bottom melt or a sump, is suitably prepared in the bottom of the furnace shell, against which the arc/arcs from the carbon electrode/electrodes are burning essentially vertically. Any metals included in the ash which are molten upon passage of the arc, slag and/or melt, and which, when melted, are mixable with the starting melt are integrated into said melt. Any other molten metallic pollutants which are unmixable with said melt generate a second metallic melt. This is the case when, e.g. an iron-based starting melt is generated and the ash contains lead. The molten lead which does not mix into the iron-based melt forms a second melt which accumulates under the iron-based melt and under certain conditions migrates down through the bottom lining of the furnace and accumulates at the bottom of the furnace shell. The furnace is therefore in special embodiments arranged with a tap hole for the metallic bottom melt and where necessary a tap hole in the bottom of the metallic furnace mantle for tapping off certain pollutants present in the ash, such as heavy metals, which are not evaporated, integrated into the slag or integrated into the bottom melt but force their way down through the refractory lining and thermal insulation of the furnace shell where they condense and accumulate at the bottom of the furnace shell.

The pollutants driven off and degraded in the arc and during the passage through slag/melt or gaseous components which in any other way have escaped from the slag, the melt or the arc to the furnace chamber are discharged to a gas treatment unit downstream of the arc furnace. To avoid condensation in the furnace chamber of metals and other inorganic substances contained in the gases, and to avoid unwanted reactions in the furnace gases, furnace parameters such as temperature, pressure and gas composition are monitored and controlled in the furnace chamber while at the same time the residence time of the gases in the furnace chamber is minimized by continuously exhausting the evolved gases into a gas treatment section arranged downstream in immediate proximity to the furnace. The furnace chamber is suitably arranged separated from the surroundings and a furnace roof arranged above the furnace shell is provided with walls, the temperature of which is maintained at a value sufficiently high to avoid the condensation of the gases which is obtained if the gases are cooled against the walls, but not so high that an unacceptable consumption of the refractory lining material used in the roof arises. Leakage to the surroundings from the furnace chamber is avoided by applying a subatmospheric pressure to the furnace, which pressure is controlled to achieve the desired evacuation of the reaction gases generated from the arc. Leakage into the furnace chamber from the surroundings, which may cause disturbances in the furnace chamber and hence contamination of the slag, is minimized by a suitable construction and/or sealing of the furnace roof and the furnace shell. Condensation of metals, organic salts, etc., and reformation or new formation of organic pollutants are essentially avoided by designing the furnace chamber separated and sealed from the surroundings and by monitoring and controlling the conditions in the furnace chamber, such as temperature, pressure and the composition of the furnace atmosphere and where necessary by monitoring and controlling the temperature of the walls of the furnace chamber.

In one preferred embodiment of the invented method a temperature above 1200° C. and a slight vacuum, preferably an underpressure of 1 mbar to 10 mbar in relation to the ambient pressure, are maintained in the closed furnace chamber, whereby condensation of metals and organic salts as well as formation of organic compounds in the furnace chamber are suppressed.

According to one embodiment of the invention gases are discharged from the furnace chamber at a temperature exceeding 1200° C. and introduced into a cooling chamber where it is rapidly cooled down to a temperature below 400° C. by spraying a cooling liquid or gas into the discharged gas stream. The gas discharged from the furnace chamber and introduced into a cooling chamber is oxidized and cooled in one or more stages, whereby the cooling media is introduced into and mixed with the discharged gas stream in the cooling chamber in a way such that contact between walls of the cooling chamber and condensing metal compounds are essentially eliminated.

The gas cleaning stage is in a preferred embodiment arranged such that metals and salts driven off from the ash may be recovered before the gases after conventional cleaning are released into the surroundings. This is achieved by rapidly cooling the gases, when they are discharged from the furnace chamber, to a temperature of at most 250°C., for example by spraying a cooling gas or liquid into the gases. Preferably, by water spraying. By the rapid cooling, formation of toxic organic compounds such as dioxine is prevented while, at the same time, a controlled condensation of metals and other evaporated inorganic compounds is obtained. Depending on the gas composition additives can in certain applications be sprayed into the gases simultaneously with the coolant or downstream of the coolant spraying to further reduce the environmental influence from the process.

The molten slag is tapped from the furnace and allowed to solidify into a form suitable for the intended use. Preferably, the slag is rapidly cooled by gas or water into a granulated vitrified material with a suitable grain size distribution to be further used as filler in cement or as earth fill. Since any pollutants contained in the glass are bound or enclosed in the glass, leaching thereof is prevented when using or depositing the glass. In one embodiment of the invention, slag is discharged from the furnace at a temperature of 1300° C. to 1600° C. through a sealed outlet arranged in the furnace shell, whereafter the slag is rapidly cooled by gas or water to a particulate vitrified material with a suitable grain size distribution for further use.

In one embodiment of the invented method, additives are mixed into the ash before said ash is supplied to the arc to influence the ratio between Si/Al/Ca in the slag and thereby the physical properties or chemical composition of the slag or the glass. Calcium-containing material, such as dolomite or limestone, and/or carbon are supplied to the slag, suitably through the arc, to influence the properties of the slag such that a foaming slag is obtained which rises and covers the arc, whereby the furnace chamber and the furnace walls are protected from the arc. Any carbon additives are checked so as not to cause an unwanted powerful gas evolution which jeopardizes the utilization of gaseous compounds separated from the process. Further, a powdered glass or a glass-forming material, such as quartz sand or broken glass, can be added, suitably through the arc, to ensure that such a composition is obtained in the slag that a vitrified material, resistant to leaching, is obtained after cooling.

A furnace invented for carrying out the invented method comprises a mantle of the d.c. arc furnace is suitably arranged in the form of a vessel sealed against the surroundings. The furnace body is made tight suitably by using a uniform furnace body or alternatively by a body with seals arranged between the furnace shell and the furnace roof. One or more sealed electrode bushings are arranged in the furnace roof to seal the electrode lead-through(s). Preferably the system for feeding particulate matter into the furnace is sealed and comprises a channel arranged in the electrode through which the particulate ash is supplied to the arc. This channel is normally arranged with an internal diameter of 20 to 150 mm, preferably with an internal diameter of 40 mm to 100 mm. Transport through the feed system may use pneumatic or mechanical transport means or a combination of mechanical and pneumatic transport. Preferably a sealed system is arranged for evacuation of the furnace chamber and discharge of gases to a gas treatment unit. Such a gas treatment unit suitably comprises at least one or more cooling chambers with means, preferably nozzles for spraying a coolant into the gases discharged from the furnace chamber, this cooling chamber and the nozzles are preferably designed such that the walls of the cooling chamber are not contacted by condensing metal compounds. Means for monitoring and controlling the temperature and pressure may be arranged within the furnace chamber. Preferably the furnace is arranged with a sealed tapping device, for example in the form of a siphon outlet or a tap hole arranged below the bath surface of the slag, whereby molten slag is discharged from the furnace shell without leakage from the surroundings. The furnace is in special embodiments arranged with a tap hole for the metallic bottom melt and where necessary a tap hole in the bottom of the metallic furnace mantle for tapping off certain pollutants present in the ash, such as heavy metals, which are not evaporated, integrated into the slag or integrated into the bottom melt but force their way down through the refractory lining and thermal insulation of the furnace shell where they condense and accumulate at the bottom of the furnace shell.

In one further embodiment of the furnace, the ash and, where suitable, also the additives which have been made to influence the properties of the slag and the glass, are supplied to the arc through a sealed feed system which at least comprises a channel arranged in an electrode. This forces the ash to pass through the arc and down into the slag and/or the metal melt. During the passage through the arc, the slag and the metal melt, the ash melts and forms an essentially liquid ash. At the same time the pollutants are at least partially driven off, decomposed and/or broken down. In the same way, the mixing of additives into the slag becomes more efficient if the additives are fed through the arc. In addition, when ash and additives are fed in through a sealed feed system, leakage from the surroundings is prevented while at the same time the supply of material to the arc and the furnace chamber is essentially limited to ash, any additives and used transport gas. Gaseous additives are supplied where necessary together with the transport gas or through special nozzles arranged in the furnace chamber. To influence the physical properties or chemical composition of the slag, suitable additives are mixed into the ash, where necessary, before the ash is supplied to the arc through the channel arranged in the electrode. Feeding of ash and additives is preferably performed through a special feed tube, which is arranged coaxially with the hollow electrode inside the hollow channel of the electrode, the electrode thus being able to move freely in the feed tube in the axial direction.

Preferred embodiments of the invention will be explained in greater detail in the following with reference to the accompanying drawings and examples.

DETAILED DESCRIPTION OF THE PREFERRED EMBODIMENT

Waste incineration generates ash which, by its large quantity and its relatively high and greatly varying contents of pollutants, is not suited for deposition or reuse. The non-combustible part can be removed by a pre-treatment of the waste, e.g., sorting out. This reduces the ash quantity but has only a marginal effect on the contents of the ash of toxic and other substances dangerous to the environment. Typically, 10–30 kg fly ash and 200–300 kg bottom ash per ton of burnt waste are generated. Through its contents of environmentally dangerous and toxic substances, this ash cannot be deposited or reused since these substances are easily released and leached from the ash. In the following it will be described how, by means of thermal treatment according to the invention in a furnace invented for the treatment, contaminated ash can be transformed into a material suitable for depositing and/or reuse under good conditions from the energy and environmental points of view.

Figure 1:
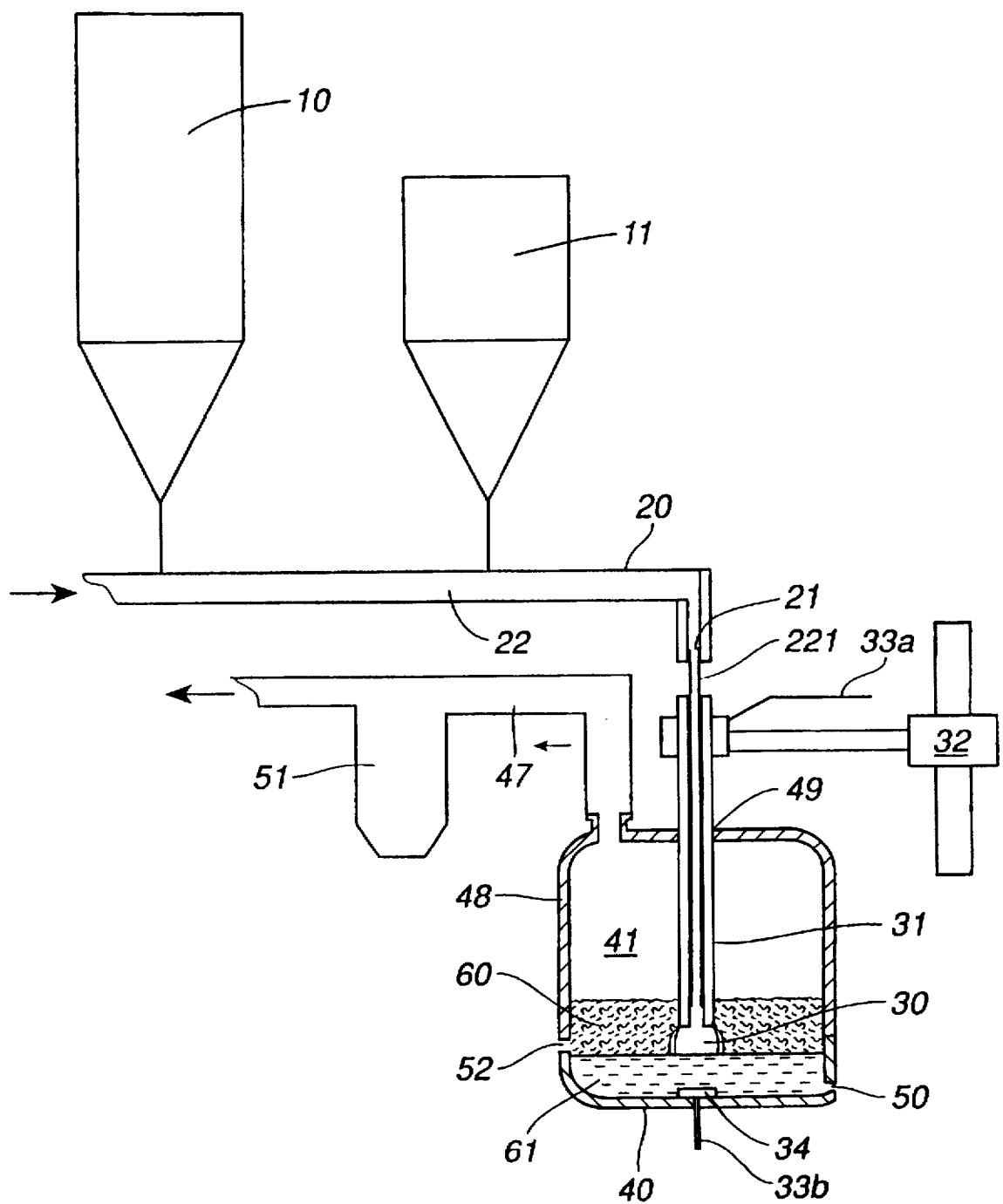
FIG. 1 shows an overall view of the invented process.

In a plant according to a preferred embodiment of the invention shown in FIG. 1, powdered ash is introduced into the plant through one or more ash containers 10, whereupon the ash is supplied through a feed system 20 to an arc 30 which is maintained between a hollow carbon or graphite electrode 31 and a metallic bottom melt 61, a considerable part of the ash being treated during the passage through the arc 30, the metal melt 61 and the slag 60 which is formed during or in connection with the treatment and is collected in the furnace shell 40 above the bottom melt 61.

The feed system 20 opens out into or in immediate proximity to the arc 30 through a channel 21 arranged in the furnace electrode 31. This channel 21 is preferably arranged with an internal diameter of 40 to 100 mm. In addition to the ash containers 10 of which only one is shown in the figure, whereas several containers may advantageously be arranged to be able to adjust the composition of ash fed into the furnace and the channel 21 arranged in the electrode, the feed system 20 comprises conduits 22 for pneumatic transport of the powdered ash from the container 10 to the arc 30. These conduits 22 may terminate in a feed tube 221 which is arranged inside the hollow channel of the carbon electrode 31 and which allows the carbon electrode 31 to be moved in the axial direction whereas the feed tube 221 remains stationary. When a feed tube 221 is used the internal diameter of this feed tube is 40 to 100 mm. The conduits 22, 221 are supplied with a transport gas for pneumatic transport of the powdered ash. The composition of the ash can be selected and, where necessary, controlled to ensure that the wanted thermal treatment of the ash in the arc 30 is obtained. It is also possible to supply active components to the gas to take care of and stabilize certain pollutants present in the ash in a less harmful state, or to ensure that harmful substances are separated from the gases driven off the ash. FIG. 1 also shows a second ash container 11 for solid additional material. The ash is preferably supplied with additional solid materials, which are added to influence the properties of the slag obtained during the treatment, for example carbon and limestone which cause the slag 60 to rise and cover the arc 30, or other substances which influence the glass or vitrified material which is obtained when the slag is tapped from the furnace and cooled, such as glass or glass-forming materials which influence the physical properties or chemical composition of the molten ash to ensure that pollutants remaining after the treatment are bound to or enclosed in the glass obtained so as to prevent leaching during deposition or reuse. FIG. 1 only shows one container 11 for additional material but a plant according to the invention comprises in certain embodiments a number of such containers whereby the additives are adapted to the composition of the supplied ash. It is, of course, also possible to mix liquid additives into the ash or to supply liquid additives to the ash or the arc 30 in connection with the ash being introduced into the arc 30. During the passage of the ash through the arc 30, the slag 60 and the bottom melt 61, the ash is under reducing conditions heated to a temperature of 1350° C. and 1750° C. and molten.

Any organic substances are essentially driven off and degraded.

Any inorganic salts are at least partially decomposed and driven off.

Any metals are at least partially separated by being evaporated or molten. Any metals included in the ash which are molten upon passage of the arc, slag and/or melt, and which, when melted, are mixable with the starting melt 61 are integrated into said melt. Any other molten metallic pollutants which are unmixable with said melt generates a second metallic melt. This is the case when e.g., an iron-based starting melt is generated and the ash contains lead. The molten lead which does not mix into the iron-based melt forms a second melt which accumulates under the iron-based melt and under certain conditions migrates down through the bottom lining of the furnace and accumulates at the bottom of the furnace shell.

The remaining part of the ash is molten and integrated into any slag present in the furnace 60 and any pollutants remaining in the ash are dissolved and/or enclosed in the molten slag 60, the slag is collected above the bottom melt 61 in a furnace shell 40.

In or close to the furnace shell 40, at least one bottom electrode 34 is arranged and connected to positive polarity, the electrode being in contact with a metallic bottom melt 61 in order to cooperate with the carbon or graphite electrode 31, connected to negative polarity, to maintain an essentially vertically burning arc 30. Both the bottom electrode and the carbon/graphite electrode are electrically insulated from the furnace shell which has been grounded.

Figure 2:
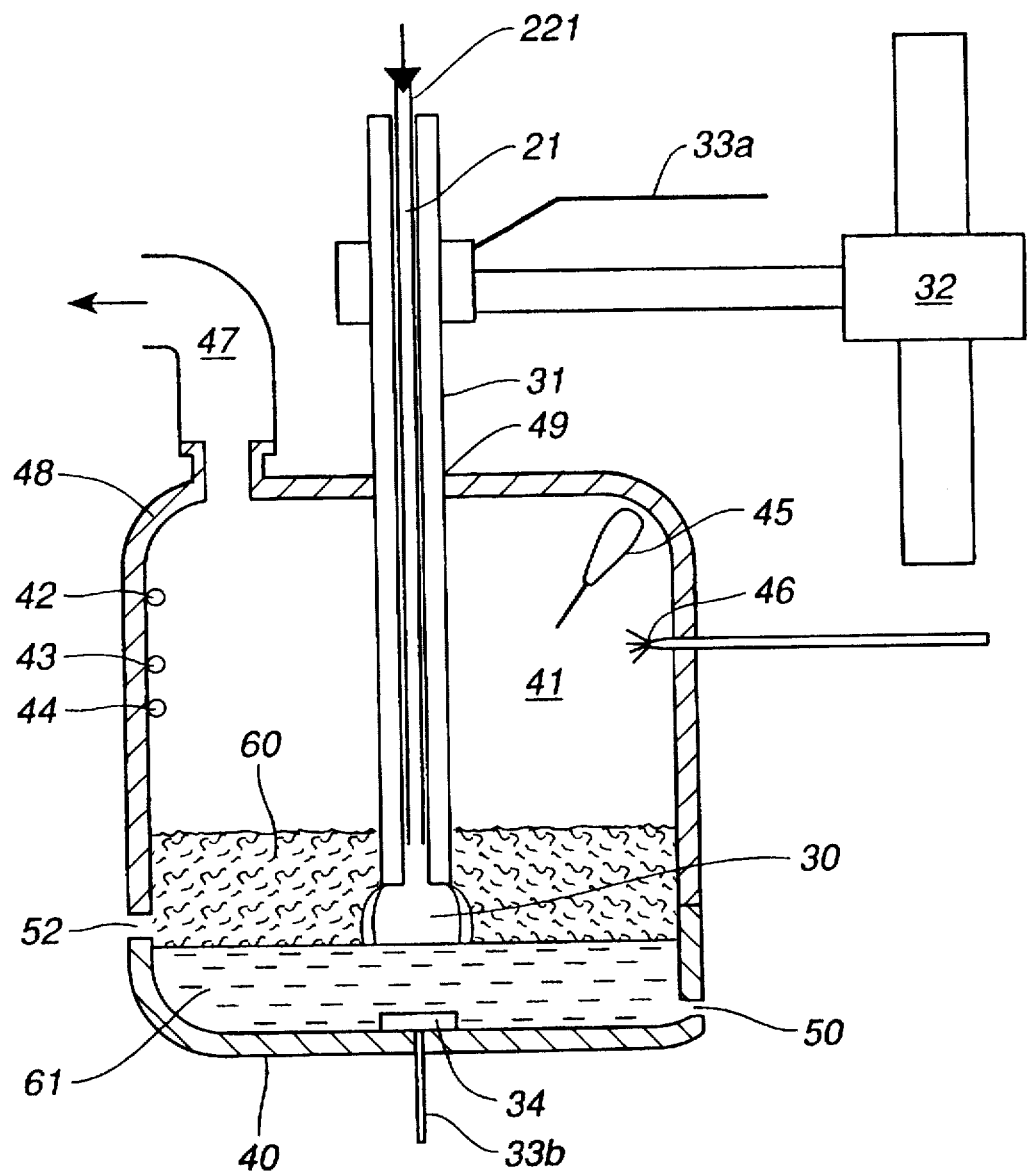
FIG. 2 shows the direct-current arc furnace invented for carrying out the process.

Gases driven off the ash are collected to a furnace chamber 41 arranged close to the arc 30. The furnace chamber is arranged separated from the surroundings, and to avoid condensation of metals and other inorganic substances contained in the gases, as well as unwanted reactions where organic pollutants may be formed again, means 42–46 are provided to monitor and control furnace parameters such as temperature, pressure and gas composition in the furnace chamber 41, exemplified in FIG. 2 by means of sensors for temperature 42, pressure 43, and gas composition 44, as well as heaters built into the furnace roof, exemplified in FIG. 2 as a burner, and/or cooling coils to adapt the wall temperature of the furnace roof such that condensation from the furnace gases is minimized with a retained low wear of the furnace lining, and nozzles 46 for spraying of gases or liquids into the furnace chamber 41. The pressure in the furnace chamber is controlled preferably by the system 47 for exhaustion of gases generated from the arc.

Further, the furnace comprises an electrode holder 32 and a bottom contact 34 arranged in the furnace shell 40 as well as necessary cables 33a, 33b for connecting the electrode 31 and the bottom contact 34 to a rectifier (not shown).

The furnace chamber 41 in the figure is arranged with a tight uniform furnace body comprising both the furnace shell 40 and a roof 48 arranged above the furnace shell, but suitably the furnace is arranged with seals (not shown) between the furnace shell 40 and the furnace roof 48. The roof may in certain embodiments be characterized more as a cover. The risks of leakage to the surroundings are reduced by putting the furnace chamber 41 at an underpressure of 1 mbar to 10 mbar in relation to the ambient pressure outside the furnace. This underpressure is suitably established and controlled by means of the exhausting device 47. Leakage from the surroundings which may cause disturbances in the furnace chamber 41 and hence contamination of the slag 60 is minimized by a suitable design of the furnace shell 40 and the roof 48, which at least comprises:

one or more sealed electrode bushings 49, a sealed feed system 20 to prevent leakage between the furnace chamber 41 and the surroundings, a sealed exhausting device 47 for evacuation of the furnace chamber 41, discharge of gases generated by the arc, and control of the subatmospheric pressure in the furnace chamber 41, and a sealed tapping device which may be in the form of a siphon outlet or, as shown in the figures, a tap hole 52 provided under the surface of the slag bath, for tapping slag from the furnace shell without leakage from the surroundings. The bottom melt, on the other hand, may, where necessary, be tapped off through a separate tap hole 50 and where necessary a tap hole, not shown, is also provided in the bottom of the metallic furnace mantle for tapping off certain pollutants present in the ash, such as heavy metals, which are not evaporated, integrated into the slag or integrated into the bottom melt but force their way down through the refractory lining and thermal insulation of the furnace shell where they condense and accumulate at the bottom of the furnace shell.

Gases exhausted from the furnace chamber 41 by means of the exhaustion device 47 are rapidly cooled after the exhaust in a cooling chamber 51, a so-called quench, arranged downstream of the furnace chamber 41, to a temperature below 400° C. by spraying a coolant in the form of a liquid or gas, preferably water, into the discharged gas stream. By the rapid cooling, it is avoided that toxic pollutants such as dioxine are formed in the gases while at the same time a controlled condensation of metals and other evaporated inorganic compounds is obtained. The discharged gas is in the cooling chamber oxidized and cooled in one or more stages and the cooling chamber and nozzles 53 for coolant are designed such that contact between condensed metal compounds and the cooling chamber walls is avoided. In one embodiment the gas is rapidly cooled to a temperature below 250° C. in the cooling chamber. Depending on the gas composition, additional additives may be sprayed into the gases in or downstream of the quench to reduce the environmental influence from the process. It is self-evident that the gas treatment equipment in a plant according to the invention comprises conventional cleaning equipment in the form of dust separators, etc., preferably arranged downstream of the quench.

After tapping off, the slag is conditioned to provide a minimum environmental influence during the intended use or deposition by dissolution or enclosure, preferably by rapidly cooling the slag and breaking it down into a powdered glass with a suitable grain size distribution.

We claim:

1. A method for thermally treating ash containing pollutants selected from the group consisting of metals, inorganic salts and organic compounds in a direct current arc furnace which includes a furnace shell containing metal melt, a furnace roof positioned over the furnace shell to define a closed furnace chamber therewithin, a bottom contact positioned adjacent the furnace shell and in contact with the metal melt, and a hollow electrode which extends through the furnace roof to a lower end above the bottom contact, said method comprising the steps of:

(a) establishing a negative polarity in said hollow electrode and a positive polarity in said bottom contact such that a voltage between the lower end of said hollow electrode and said bottom contact creates a reducing arc from the lower end of the hollow electrode toward the metal melt in said furnace shell and said bottom contact, (b) supplying said ash to said hollow electrode so as to fall into said arc and be rapidly heated to between 1350° and 1750° C. so that metals in said ash are partially reduced to form a first portion which is driven to the furnace chamber and a second portion which mixes with the metal melt, wherein inorganic salts in said ash are at least partially decomposed and driven to the furnace chamber, wherein organic compounds in said ash are broken down and driven to the furnace chamber, and wherein remaining portions of said ash form a slag above said metal melt in said furnace shell, (c) maintaining the furnace chamber at a temperature of over 1200° C. and a pressure of 1 to 10 mbar below ambient pressure external to the furnace, (d) removing a gas stream containing gaseous pollutants from said furnace chamber for oxidation and cooling, and (e) removing slag from said furnace shell and cooling said removed slag to form a glass or a material having a glass-like matrix which trap harmful pollutants.

2. A method according to claim 1, including a step of spraying cooling media into said gas stream removed from said furnace chamber in step (d) so as to rapidly cool said gas stream to below 400° C.

3. A method according to claim 2, including passing said gas stream removed from said furnace chamber into a cooling chamber and wherein said cooling media is sprayed into said gas stream such that contact between condensing metal compounds from said gas stream and walls of the cooling chamber is essentially prevented.

4. A method according to claim 1, including a step of adding substances to said ash prior to being supplied to said hollow electrode in step (b) to adjust the chemical composition of slag and glass generated from said ash.

5. A method according to claim 1, including steps of removing slag from said furnace shell and spraying cooling media onto said removed slag to provide a particulate vitrified material.

6. A direct current arc furnace for the thermal treatment of ash containing pollutants selected from the group consisting of metals, inorganic salts and organic compounds, said arc furnace comprising:

a furnace shell for containing metal melt and slag, said furnace shell defining a tap hole for metal melt, a roof positioned over said bottom shell to define a sealed furnace chamber therewithin, a bottom contact positioned adjacent said bottom shell and in contact with the metal melt, a hollow electrode which sealingly extends through a bushing in said roof to a lower end above said bottom contact, electrical supply means connected to said bottom contact and said electrode to provide said bottom contact with a positive polarity and said electrode with a negative polarity and create an arc extending from the lower end of said electrode toward said metal melt contained in said furnace shell and said bottom contact, a sealed ash feed system for supply of ash to said hollow electrode for delivery to said arc where said ash is converted to metal melt and slag in said furnace shell and gases in said furnace chamber, a sealed exhaust system connected to said roof to convey a gas stream from said furnace chamber to a gas treatment plant, and means for monitoring gas temperature and pressure within said furnace chamber and for maintaining in said temperature above 1200° C. and said pressure at 1 to 10 mbar below ambient pressure external to said arc furnace.

7. A direct current arc furnace according to claim 6, wherein said hollow electrode provides a bore having a diameter of between 20 and 150 mm.

8. A direct current arc furnace according to claim 6, wherein said sealed exhaust system includes a cooling chamber with nozzles therein for spraying cooling media into said gas stream in said cooling chamber.

9. A direct current arc furnace according to claim 8, wherein said nozzles are directed inwardly of said cooling chamber to essentially prevent condensing metal compounds from said gas stream contacting walls of said cooling chamber.

* * * * *